US012580766B2

(12) United States Patent
Adur et al.

(10) Patent No.: US 12,580,766 B2
(45) Date of Patent: Mar. 17, 2026

(54) DIGITAL KEY AUTHENTICATION UTILIZING DEVICE METADATA

(71) Applicant: Omnissa, LLC, Mountain View, CA (US)

(72) Inventors: Anoop Adur, Bangalore (IN); Bhanu Prakash Vandana, Palo Alto, CA (US); Makrand Sethi, Bangalore (IN); Aditya Ulman, Bangalore (IN); Saurav Choudhuri, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 79 days.

(21) Appl. No.: 18/607,384

(22) Filed: Mar. 15, 2024

(65) Prior Publication Data

US 2025/0125959 A1 Apr. 17, 2025

(30) Foreign Application Priority Data

Oct. 17, 2023 (IN) .............................. 202341070741

(51) Int. Cl.
*H04L 9/32* (2006.01)
*H04L 9/08* (2006.01)

(52) U.S. Cl.
CPC ............ *H04L 9/321* (2013.01); *H04L 9/0872* (2013.01)

(58) Field of Classification Search
CPC ............................... H04L 9/321; H04L 9/0872
See application file for complete search history.

(56) References Cited

U.S. PATENT DOCUMENTS

| | | | | |
|---|---|---|---|---|
| 11,936,671 | B1 * | 3/2024 | Meller | H04L 63/08 |
| 11,997,219 | B1 * | 5/2024 | Russell | H04L 9/3268 |
| 2007/0006321 | A1 * | 1/2007 | Bantz | G06F 21/6218 |
| | | | | 726/27 |
| 2013/0097318 | A1 * | 4/2013 | Gladstone | H04L 63/107 |
| | | | | 709/226 |
| 2014/0344446 | A1 * | 11/2014 | Rjeili | H04L 43/04 |
| | | | | 709/224 |
| 2015/0154417 | A1 * | 6/2015 | Pasumarthi | G06Q 10/06 |
| | | | | 726/30 |
| 2018/0006814 | A1 * | 1/2018 | Schroeder | H04L 9/0877 |
| 2018/0007059 | A1 * | 1/2018 | Innes | G06F 21/6218 |
| 2019/0068568 | A1 * | 2/2019 | Liderman | H04L 9/3263 |
| 2020/0372002 | A1 * | 11/2020 | Cronan | G06F 16/13 |
| 2022/0014507 | A1 * | 1/2022 | Hawkins | H04L 63/1416 |
| 2022/0210173 | A1 * | 6/2022 | Katmor | H04L 63/1416 |
| 2023/0222390 | A1 * | 7/2023 | Tofighbakhsh | H04L 9/3213 |
| | | | | 707/736 |
| 2024/0012121 | A1 * | 1/2024 | Scharf | G01S 17/931 |
| 2024/0232443 | A1 * | 7/2024 | Nambannor Kunnath | |
| | | | | G06F 21/84 |
| 2025/0112430 | A1 * | 4/2025 | Meyers | H01R 43/002 |

OTHER PUBLICATIONS

Yiliyaer et al.; "Secure Access Service Edge: A Zero Trust Based Framework For Accessing Data Securely", 2022, IEEE, pp. 0587-0591. (Year: 2022).*

* cited by examiner

*Primary Examiner* — Matthew Smithers

(74) *Attorney, Agent, or Firm* — Kim & Stewart LLP

(57) ABSTRACT

Various examples are disclosed for an authentication model for user sessions utilizing a digital key incorporating metadata identifying device location and network conditions. Upon user authentication of a session, a digital key can be generated that incorporates information about the location and network conditions of a device, which can be utilized to grant conditional access to resources.

20 Claims, 4 Drawing Sheets

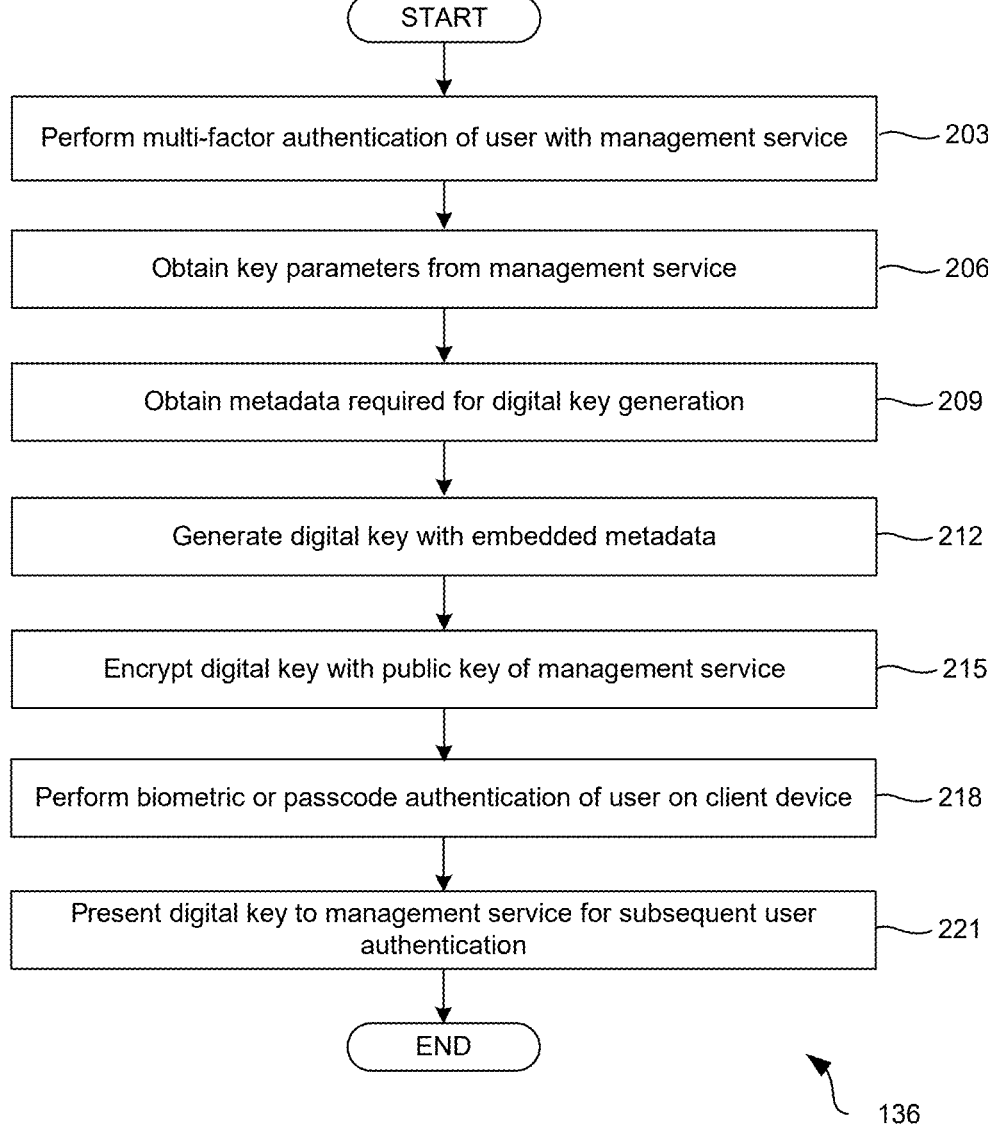

START

Perform multi-factor authentication of user with management service — 203

Obtain key parameters from management service — 206

Obtain metadata required for digital key generation — 209

Generate digital key with embedded metadata — 212

Encrypt digital key with public key of management service — 215

Perform biometric or passcode authentication of user on client device — 218

Present digital key to management service for subsequent user authentication — 221

END

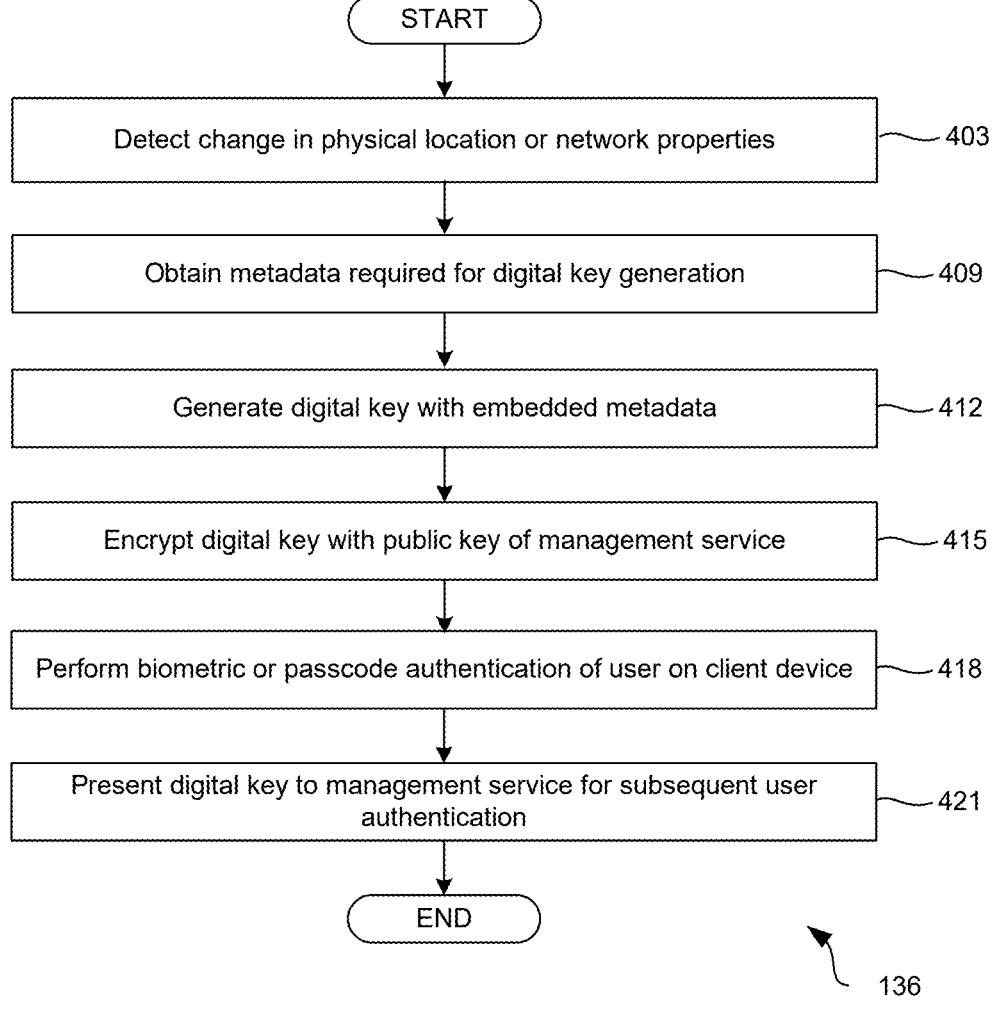

START

Detect change in physical location or network properties —403

Obtain metadata required for digital key generation —409

Generate digital key with embedded metadata —412

Encrypt digital key with public key of management service —415

Perform biometric or passcode authentication of user on client device —418

Present digital key to management service for subsequent user authentication —421

END

DIGITAL KEY AUTHENTICATION UTILIZING DEVICE METADATA

CROSS-REFERENCES

This application claims the benefit of Indian Patent Application number 202341070741, entitled "DIGITAL KEY AUTHENTICATION UTILIZING DEVICE META-DATA," filed on Oct. 17, 2023, of which is hereby incorporated by reference in its entirety.

BACKGROUND

Users in enterprise environment are increasingly mobile. Some users may work remotely from home, other users may travel frequently between various offices of an enterprise, and some users might work exclusively on the road from hotels, coffee shops, and the like. Additionally, enterprises are increasingly utilizing device management services to manage user devices. As users move between different locations and on different networks, the risks presented by vulnerabilities can change. Accordingly, zero trust systems often verify other aspects of a user's session, such as the location and network conditions under which the user is connecting to an enterprise system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 is a drawing showing a flowchart according to one example of the disclosure.

FIG. 4 is a flowchart according to one example of the disclosure.

DETAILED DESCRIPTION

Figure 1:
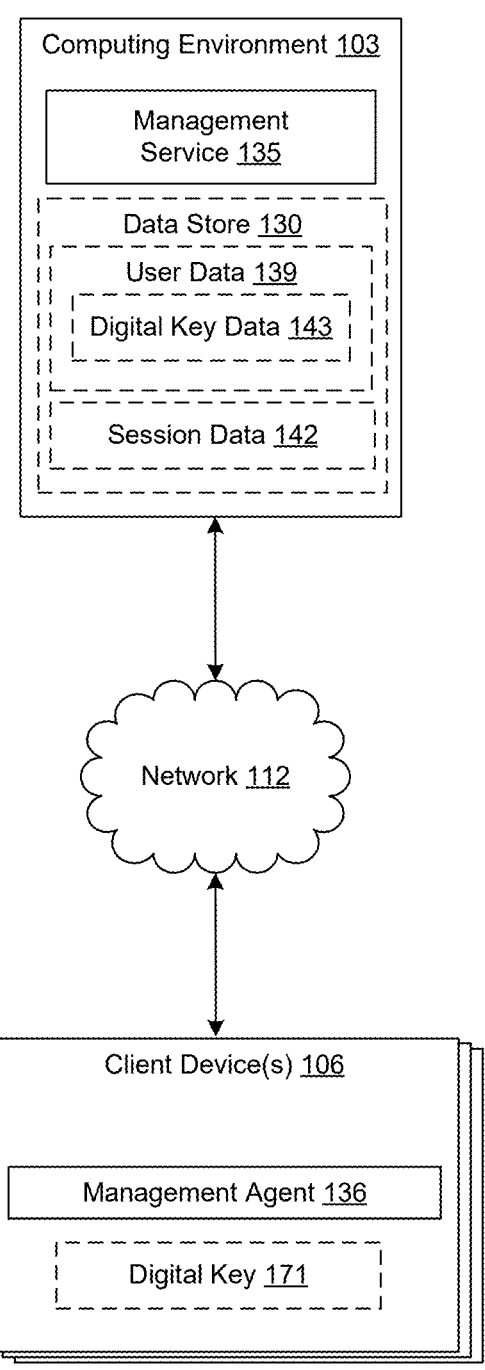
FIG. 1 is a drawing of an example of a computing environment according to one example of the disclosure.

The present disclosure relates to passwordless and zero-trust access control in a computing environment. The computing environment can include client devices and users that are authenticated with an authentication provider or a management service. In some environments, the client devices can be enrolled with a management service as managed devices. A managed device can be managed by a remotely executed management service with a management agent that is installed on the client device. The management agent can be a portion of an operating system of the client device or an application that is installed with elevated privileges on the client device to carry out management tasks on behalf of the management service.

For example, the management service can enforce compliance rules and policies on client devices via operating system application programming interfaces (APIs) that allow for device management features. Compliance rules can include management rules, security rules, and other configuration data for execution by and/or enforcement on the client device. This can include management, security, and other configuration profiles that can include VPN certificates, Wi-Fi profiles, email profiles and other profiles or policies.

The management agent running on a client device can obtain information about the device that can be utilized to continuously evaluate the security posture of a device to enable zero-trust authentication of a user and the client device. The management agent, or another application running on the client device, can generate a digital key using one or more key parameters specified by the management service after an initial authentication of the user. The digital key can be presented by the client device to access systems for which the management service or an authentication service can authenticate access. The digital key can include metadata that identifies a physical location and/or network properties of the client device, which can be utilized to determine an access level that should be granted to the client device. The access level can define which enterprise resources the user is entitled to access based upon the physical location and/or network properties of the client device being utilized by the user.

Zero trust enabled systems can perform continuous evaluation of user, device and network postures. When a change is detected in any of these postures, the management agent can generate a new digital key on the client device, which can incorporate the updated posture of the user, device, and/or network. The new digital key can be presented to the management service, which can determine a change, if any, in the access level that should be granted to the user.

In some examples, the management service can detect a change in the posture of the user, device, location, or network properties of the client device and request that the management agent generate a new digital key. Similar to above, the new digital key can be presented to the management service, which can determine a change, if any, in the access level that should be granted to the user.

With reference to FIG. 1, an example of a networked environment 100 is shown. The networked environment 100 can include a computing environment 103, a client device 106 (or one or more client devices 106) in communication with one other over a network 112. The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer, or any other system providing computing capability. Alternatively, the computing environment 103 can include a plurality of computing devices that are arranged, for example, in one or more server banks, computer banks, or other arrangements. The computing environment 103 can include a grid computing resource or any other distributed computing arrangement. The computing devices can be located in a single installation or can be distributed among many different geographical locations.

The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 112, the computing environment 103 can be described as a remote computing environment 103.

Various applications can be executed in the computing environment 103. For example, a management service 135 as well as other applications, may be executed in the computing environment. Also, various data is stored in a data store 130 that is accessible to the computing environment 103. The data store 130 may be representative of a plurality of data stores 130, which can include relational databases, object-oriented databases, hierarchical databases, hash tables or similar key-value data stores, as well as other data storage applications or data structures. The data stored in the data store 130 is associated with the operation of the various applications or functional entities described below.

The management service 135 can oversee the operation of client devices 106 enrolled with the management service 135. In some examples, an enterprise, such as a company, organization, or other entity, can operate the management service 135 to oversee or manage the operation of the client devices 106 of its employees, contractors, customers, or other users having accounts with the enterprise. An enterprise can include any customer of the management service 135.

The management service 135 can provide an administrative interface for configuring the operation of the management service 135 and the configuration of client devices 106 that are administered by the management service 135. Accordingly, a management console can correspond to a web page or web application provided by a web server hosted in the computing environment 103. For example, the management console can provide an interface for an administrative user to create configuration profiles to be applied to client device 106, identify application updates that may be required on client device 106, define recommended applications or updates for client device 106, identify security requirements for client device 106, recommend training that is available for users associated with client device 106, as well as various other actions related to the operation of various implementations.

The console can also allow an administrative user to define a type of multifactor authentication required to initially authenticate user. The console can allow an administrative user to define the time interval after which the client device can be required to generate a new digital key. The console can also allow the administrator to define one or more key parameter. A key parameter can include a key length, an algorithm that the client device 106 should utilize to generate the digital key 171, and metadata that should be included in the key or upon which the digital key 171 should be based, such as a physical location, or network properties of the client device 106. The network properties of the client device 106 can include whether the client device 106 is connected to the management service 135 via a private network or local network, such as an enterprise network, whether the client device 106 is connected via a virtual private network (VPN) connection, or whether the client device 106 is connected to the management service 135 via the Internet or a public network.

In some examples, the data store 130 can include a database or other memory that includes, for example, user data 139 and session data 142. User data 139 can store or reference information about the user of an enterprise, such as the user's calendar, email, and other user data. Additionally, user data 139 can include usage logs having records of user interactions with a session served up by or monitored by the management service 135 or other types of workloads.

User interactions can include, for example, log-on requests, log-off requests, particular actions performed in a session, periods of activity or inactivity, as well as other interactions. Each interaction can be stored in the data store 130 in association with a timestamp describing the time the user interaction was performed. One or more location signals associated with the user's location can also be stored in the data store 130 as user data 139.

Location signals can identify a location of the user as reported by a client device 106 of the user that reports its location data to the management service 135. A location signal can comprise a geographic location of a client device 106, an IP address of a client device 106 that is connected to a session provided or monitored by the management service 135, or a network connection type. A network connection type can identify whether a network connection of the client device 106 is a wired or wired connection, a network provider or domain of the connection, whether the connection is a secure or VPN connection, and other connection properties that can be determined by a management agent 136 running on the client device 106 and reported to the management service 135.

User data 139 can further include digital key data 143. Digital key data 143 can comprise information about a digital key 171 generated by the client device 106 to authenticate the client device 106 and/or user with the management service 135. The digital key data 143 can comprise a key signature or a copy of the digital key 171. The digital key data 143 can also specify the creation date or age of the digital key 171.

Session data 142 can comprise information about user sessions between a client device 106 and a system that is monitored by the management service 135 according to examples of the disclosure. A session can authenticated by the management service 135 or an identity management service. The session can be authenticated using a username and password or other authentication factors, such as a multi-factor authentication process, a passkey, or certificate-based authentication. The management service 135 can populate the session data 142 with information about the session, such as an IP address and other network information of the client device 106 when a session was initiated or created. The session data 142 can also identify a geographic location of a client device 106 when the session was initiated or created. The session data 142 can further identify other status information about the client device 106 when the session was initiated or created, such as a device type, operating system version.

Various compliance rules can be enforced on client devices 106 that are enrolled as managed devices with the management service 135. For example, a compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

A client device 106, collectively referred to as managed devices or client devices, can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client devices can include one or more displays, such as liquid crystal displays (LCDs), gas plasma-based flat panel displays, organic light emitting diode (OLED) displays, electrophoretic ink ("E-ink") displays, projectors, or other types of display devices.

A client device 106 is enrolled with the management service 135 and can communicate with the management service 135 via the network 112. The client device 106 can be configured to execute various applications such as a management agent 136 and potentially other applications. The management agent 136 can be installed on the client device 106 to facilitate management of the client device 106 by the management service 135. The management agent 136 can be installed with elevated privileges or be effectuated through operating system APIs to manage the client device 106 on behalf of the management service 135. The management agent 136 can have the authority to manage data on the client device 106; install, remove, or disable certain applications; or install configuration profiles, such as VPN certificates, Wi-Fi profiles, email profiles, or other profiles for configuring various functions or applications of the client device 106 or offline client device 106.

The management agent 136 can generate a digital key 171 on behalf of a user that the client device 106 can utilize to authenticate the client device 106 and/or the user with the management service 135. Accordingly, the management agent 136 can facilitate an initial enrollment or authentication with the management service 135. The management service 135, in some implementations, can require a multi-factor authentication process to be completed for an initial authentication. The multi-factor authentication can involve verification of a username, password, and another authentication factor, such as a code that can be asynchronously or separately provided to the user. The additional authentication factor can be generated by the management service 135 or comprise a time-based onetime password (TOTP) that is generated by both the management service 135 and the client device 106. The additional authentication factor, if a code, can be sent to a user's mobile device via a messaging protocol, email, or a voice call.

After performing the initial authentication of the user, the management agent 136 can generate a digital key 171 according to at least one key parameter obtained from the management service 135. A key parameter can include a key length, an algorithm that the client device 106 should utilize to generate the digital key 171, and metadata that should be included in the key or upon which the digital key 171 should be based, such as a physical location, or network properties of the client device 106. The digital key 171 can be stored on the client device 106. The digital key 171 can comprise metadata that identifies the physical location of the client device 106 when the digital key 171 was generated as well as network properties of the network connection through which the client device 106 is connected to the management service 135. The metadata can be included as a header, table, or other data structure within the digital key 171.

In some implementations, the management agent 136 can obtain a public key corresponding to a private key held by the management service 135. The management agent 136 can encrypt the digital key 171 with the public key. In this way, when the encrypted digital key 171 is presented to the management service 135 for authentication, the management service 135 can decrypt the digital key 171 using the private key and inspect its contents.

Once the management agent 136 generates the digital key 171, the management agent 136 can utilize the digital key 171 for presentation to the management service 135 for user authentication. In some examples, the management service 135 can utilize a biometric authentication feature or a passcode unlock feature of the client device 106 that requires the user to provide a passcode or biometric authentication to the operating system of the client device 106 as a prerequisite to providing the digital key 171 to the management service 135. For example, before performing an action that requires authentication by the management service 135, the management agent 136 can determine whether the client device 106 is in an unlocked state or require biometric authentication of the user before authenticating with the management service 135 using the digital key 171.

In some implementations, the digital key 171 can be generated by the management agent 136 in response to a notification or request from the management service 135 to do so. Once the digital key 171 is generated, the management agent 136 can provide and the management service 135 can store digital key data 143 that identifies a timestamp of creation of the digital key 171 as well as metadata that is embedded in the digital key 171.

In some examples, the management agent 136 can automatically generate a new digital key 171 when a physical location of the client device 106 has changed from an approved physical location to an unapproved physical location, or vice versa. Additionally, the management agent 136 can automatically generate a new digital key 171 when a network property of the client device 106/has changed. For example, if the network connection of the client device 106 changes from a private or virtual private network connection to a public internet connection, the management agent 136 can generate a new digital key 171. When generating a new digital key 171, the management agent 136 can incorporate metadata indicating the change in physical location or network properties of the client device 106.

The management service 135 can grant various levels of access to the user of the client device 106 depending upon the metadata embedded into the digital key 171 that is presented by the management agent 136 to the management service 135. As a non-limiting example, there can be four different levels of access depending upon the physical location and the network properties of the client device 106. A highest level of access can be granted to a digital key 171 generated by the management agent 136 that indicates that the client device 106 is in an approved physical location, such as within the offices or buildings of the enterprise, and connected to an approved network, such as a private network or a virtual private network of the enterprise. The highest level of access can, for example, allow the client device 106 to access enterprise resources without further user authentication.

A next highest level of access can be granted to a digital key 171 generated by the management agent 136 that indicates that the client device 106 is not in an approved physical location, such as within the offices or buildings of the enterprise, but is connected to an approved network, such as a private network or a virtual private network of the enterprise. The next highest level of access can, for example, allow the client device 106 to access certain enterprise resources without further user authentication but require additional user authentication or simply disallow access to other resources.

A lower level of access can be granted to a digital key 171 generated by the management agent 136 that indicates that the client device 106 is in an approved physical location, such as within the offices or buildings of the enterprise, but is not connected to an approved network, such as a private network or a virtual private network of the enterprise. The lower level of access can, for example, allow the client device 106 to access certain enterprise resources without further user authentication but require additional user authentication or simply disallow access to even more resources.

A lowest level of access can be granted to a digital key 171 generated by the management agent 136 that indicates that the client device 106 is not in an approved physical location, such as within the offices or buildings of the enterprise, and is not connected to an approved network, such as a private network or a virtual private network of the enterprise. The lowest level of access can, for example, allow the client device 106 to access fewer enterprise resources or require further user authentication simply disallow access to more resources.

An administrator can also configure the access granted to the various levels of digital key 171 that can be generated by the management agent 136. The management agent 136 can automatically generate a new digital key 171 according to a key rotation schedule that can be programmed into the management agent 136 or in response to a notification received from the management service 135.

Moving on to FIG. 2, shown is a flowchart that provides one example of the operation of a portion of the networked environment 100. The flowchart of FIG. 2 can be viewed as depicting an example of elements of a method implemented by management agent 136 according to one or more examples. FIG. 2 illustrates how management agent 136 can generate a digital key 171 that can be used to authenticate a user and/or client device 106 with the management service 135 or an authentication service such as a single sign-on system. The separation or segmentation of functionality as discussed herein is presented for illustrative purposes only.

Beginning with step 203, the management agent 136 can perform a multi-factor authentication with the management agent 136 based upon one or more authentication factor. In some implementation, a multi-factor authentication may not be required and the management agent 136 can perform a user authentication based upon a username and password.

The authentication performed in step 203 can be an initial authentication or enrollment of the user into an authentication scheme based upon a digital key 171 generated by the management agent 136. The multi-factor authentication can involve verification of a username, password, and another authentication factor, such as a code that can be asynchronously or separately provided to the user. The additional authentication factor can be generated by the management service 135 or comprise a time-based onetime password (TOTP) that is generated by both the management service 135 and the client device 106. The additional authentication factor, if a code, can be sent to a user's mobile device via a messaging protocol, email, or a voice call.

At step 206, after performing the initial authentication of the user, the management agent 136 can obtain one or more key parameters from the management service 135. A key parameter can include a key length, an algorithm that the client device 106 should utilize to generate a digital key 171, and metadata that should be included in the key or upon which the digital key 171 should be based, such as a physical location, or network properties of the client device 106. The digital key 171 can comprise metadata that identifies the physical location of the client device 106 when the digital key 171 was generated as well as network properties of the network connection through which the client device 106 is connected to the management service 135. The metadata can be included as a header, table, or other data structure within the digital key 171.

Key parameters can include a location of the client device 106 based upon GPS or other location coordinates identified by the management agent 136 on the client device 106. The network properties of the client device 106 can include whether the client device 106 is connected to the management service 135 via a private network or local network, such as an enterprise network, whether the client device 106 is connected via a virtual private network (VPN) connection, or whether the client device 106 is connected to the management service 135 via the Internet or a public network. The network properties can also include IP address information of the client device 106.

The management agent 136 can also obtain a public key of the management service 135 that can be used to encrypt the digital key 171.

At step 209, the management agent 136 can obtain the metadata required for generating the digital key 171. The metadata can comprise the values of the key parameters identified by the management service 135, such as a location of the client device 106 and/or network properties of the client device 106.

At step 212, the management agent 136 can generate the digital key 171 with the metadata obtained at step 209. The digital key 171 can be generated according to the key parameters specified by the management service 135 at step 206, which can identify an algorithm utilized to generate the digital key 171, a key length, and other key parameters or certificate parameters.

At step 215, the management agent 136 can encrypt the digital key 171 using the public key of the management service 135 obtained at step 206. By encrypting the digital key 171 using the public key of the management service 135, only systems in possession of the private key of the management service 135 can access the digital key 171.

At step 218, the management agent 136 can perform a biometric authentication or passcode authentication of the user of the client device 106. The management agent 136 can utilize the operating system's biometric or passcode authentication capabilities before allowing the user to utilize systems that are authenticated using the digital key 171.

At step 221, the management agent 136 can present the digital key 171 to the management service 135 or another authentication system to perform user authentication. In one example, depending upon the metadata incorporated into the digital key 171, the management service 135 can grant conditional access to enterprise resources based upon the physical location or the network properties of the client device 106 that are embedded into the digital key 171. Thereafter, the process proceeds to completion.

Figure 3:
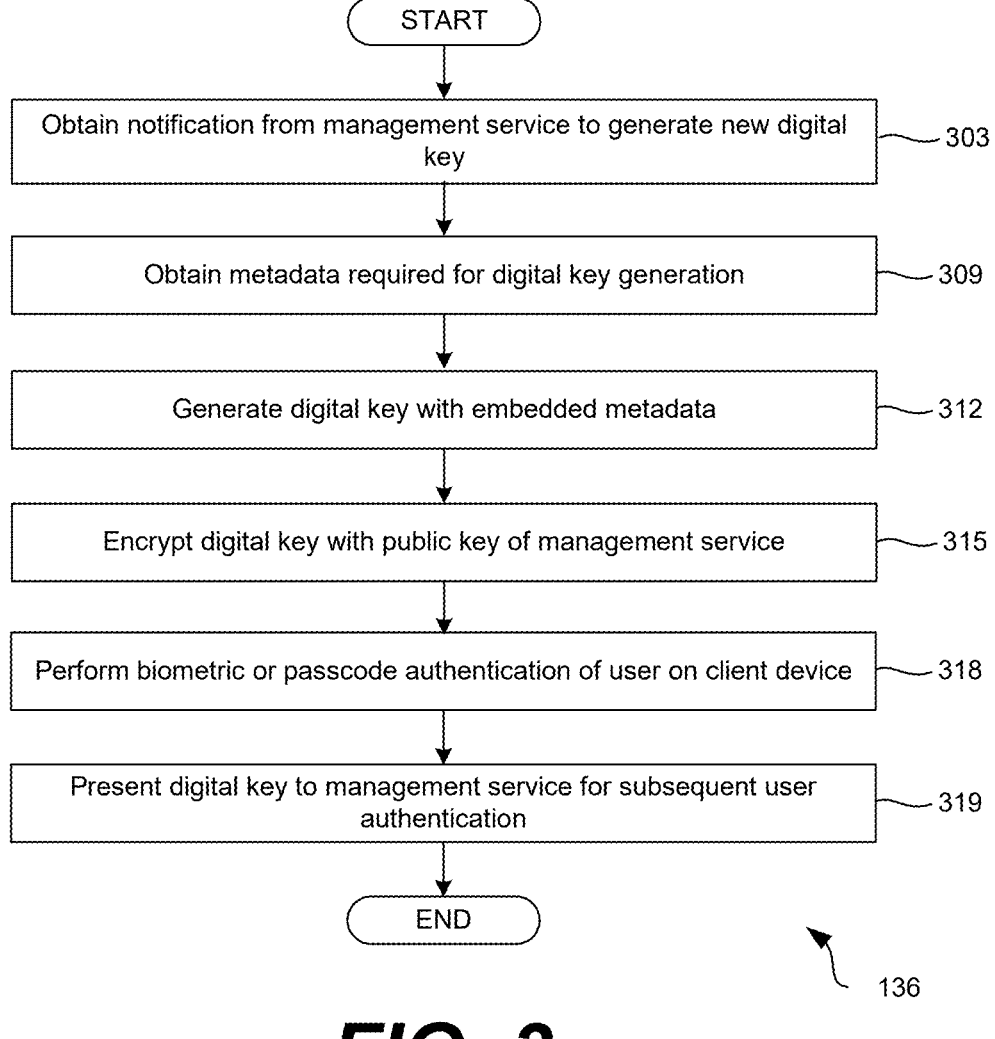
FIG. 3 is a drawing showing a flowchart according to one example of the disclosure.

Moving on to FIG. 3, shown is a flowchart that provides one example of the operation of a portion of the networked environment 100. The flowchart of FIG. 3 can be viewed as depicting an example of elements of a method implemented by management agent 136 according to one or more examples. FIG. 3 illustrates how management agent 136 can generate a digital key 171 that can be used to authenticate a user and/or client device 106 with the management service 135 or an authentication service such as a single sign-on system. The separation or segmentation of functionality as discussed herein is presented for illustrative purposes only. In the process shown in FIG. 3, the management agent 136 generates the digital key 171 in response to a notification or command received from the management service 135.

Beginning with step 303, the management agent 136 can obtain a notification or command from the management service 135 to generate a new digital key. The command can be generated based upon a key rotation schedule or in response to detecting a change in network conditions or a physical location of the client device 106. In some examples, the management agent 136 can automatically determine that a new digital key 171 should be generated based upon a key expiration time or a key rotation schedule that can be specified by the management service 135 or an administrator.

At step 309, the management agent 136 can obtain the metadata required for generating the digital key 171. The metadata can comprise the values of the key parameters identified by the management service 135, such as a location of the client device 106 and/or network properties of the client device 106.

At step 312, the management agent 136 can generate the digital key 171 with the metadata obtained at step 309. The digital key 171 can be generated according to the key parameters specified by the management service 135, which can identify an algorithm utilized to generate the digital key 171, a key length, and other key parameters or certificate parameters.

At step 315, the management agent 136 can encrypt the digital key 171 using the public key of the management service 135. By encrypting the digital key 171 using the public key of the management service 135, only systems in possession of the private key of the management service 135 can access the digital key 171.

At step 318, the management agent 136 can perform a biometric authentication or passcode authentication of the user of the client device 106. The management agent 136 can utilize the operating system's biometric or passcode authentication capabilities before allowing the user to utilize systems that are authenticated using the digital key 171.

At step 319, the management agent 136 can present the digital key 171 to the management service 135 or another authentication system to perform user authentication. In one example, depending upon the metadata incorporated into the digital key 171, the management service 135 can grant conditional access to enterprise resources based upon the physical location or the network properties of the client device 106 that are embedded into the digital key 171. Thereafter, the process proceeds to completion.

Moving on to FIG. 4, shown is a flowchart that provides one example of the operation of a portion of the networked environment 100. The flowchart of FIG. 4 can be viewed as depicting an example of elements of a method implemented by management agent 136 according to one or more examples. FIG. 4 illustrates how management agent 136 can generate a digital key 171 that can be used to authenticate a user and/or client device 106 with the management service 135 or an authentication service such as a single sign-on system. The digital key 171 is generated in response to detecting a change in a physical location or the network properties of the client device 106. The separation or segmentation of functionality as discussed herein is presented for illustrative purposes only.

Beginning with step 403, the management agent 136 can detect a change in physical location or network properties relative to the last time a digital key 171 was generated by the management agent 136 and stored on the client device 106. In some examples, the management agent 136 can automatically generate a new digital key 171 when a physical location of the client device 106 has changed from an approved physical location to an unapproved physical location, or vice versa. Additionally, the management agent 136 can automatically generate a new digital key 171 when a network property of the client device 106/has changed. For example, if the network connection of the client device 106 changes from a private or virtual private network connection to a public internet connection, the management agent 136 can generate a new digital key 171. When generating a new digital key 171, the management agent 136 can incorporate metadata indicating the change in physical location or network properties of the client device 106.

At step 409, the management agent 136 can obtain the metadata required for generating the digital key 171. The metadata can comprise the values of the key parameters identified by the management service 135, such as a location of the client device 106 and/or network properties of the client device 106.

At step 409, the management agent 136 can generate the digital key 171 with the metadata obtained at step 306. The digital key 171 can be generated according to the key parameters specified by the management service 135, which can identify an algorithm utilized to generate the digital key 171, a key length, and other key parameters or certificate parameters.

At step 415, the management agent 136 can encrypt the digital key 171 using the public key of the management service 135. By encrypting the digital key 171 using the public key of the management service 135, only systems in possession of the private key of the management service 135 can access the digital key 171.

At step 418, the management agent 136 can perform a biometric authentication or passcode authentication of the user of the client device 106. The management agent 136 can utilize the operating system's biometric or passcode authentication capabilities before allowing the user to utilize systems that are authenticated using the digital key 171.

At step 421, the management agent 136 can present the digital key 171 to the management service 135 or another authentication system to perform user authentication. In one example, depending upon the metadata incorporated into the digital key 171, the management service 135 can grant conditional access to enterprise resources based upon the physical location or the network properties of the client device 106 that are embedded into the digital key 171. Thereafter, the process proceeds to completion.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 106106 can be used to access user interfaces generated to configure or otherwise interact with the management service 135. These client devices 106 can include a display upon which a user interface generated by a client application for providing a virtual desktop session (or other session) can be rendered. In some examples, the user interface can be generated using user interface data provided by the computing environment 103. The client device 106 can also include one or more input/output devices that can include, for example, a capacitive touchscreen or other type of touch input device, fingerprint reader, or keyboard.

Although the management service 135 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

The invention claimed is:

1. A system, comprising:
   a client device;
   instructions stored in memory and executable in the client device that, when executed by the client device, cause the client device to:
      authenticate a user and the client device based upon at least one authentication mechanism with a remotely executed management service;
      obtain at least one key parameter from the management service, the at least one key parameter specifying how a digital key should be created by the client device;
      generate the digital key according to the at least one key parameter, wherein the digital key is generated dependent upon at least one of a location of the client device or a network property to which the client device is connected, the digital key comprising metadata identifying the location and the network property;
      encrypt the digital key with a public key corresponding to the management service; and
      provide an encrypted digital key to the management service to subsequently authenticate the user and the client device, wherein the management service provides conditional access based upon the metadata.

2. The system of claim 1, wherein the conditional access provides access to a full set of resources in response to the location comprising an approved location and the network property comprising an approved network property.

3. The system of claim 1, wherein the conditional access provides access to a subset of a set of resources in response to at least one of the location comprising an unapproved location or the network property comprising an unapproved network property.

4. The system of claim 1, wherein the instructions authenticate the user and the client device based upon the at least one authentication mechanism with a remotely executed management service by performing a multi-factor authentication process with the management service, wherein the multi-factor authentication process comprises a username, a password, and a secondary authentication factor.

5. The system of claim 1, wherein the instructions generate the digital key according to the at least one key parameter by generating a key according to a key generation algorithm specified by the management service.

6. The system of claim 1, wherein the instructions further generate a new digital key according to the at least one key parameter in response to detecting a change in the location or the network property.

7. The system of claim 6, wherein the network property comprises an indication of whether a network connection of the client device is through a private network connection.

8. A non-transitory computer-readable medium embodying program code executable in a client device that, when executed by the client device, causes the client device to:

authenticate a user and the client device based upon at least one authentication mechanism with a remotely executed management service;

obtain at least one key parameter from the management service, the at least one key parameter specifying how a digital key should be created by the client device;

generate the digital key according to the at least one key parameter, wherein the digital key is generated dependent upon at least one of a location of the client device or a network property to which the client device is connected, the digital key comprising metadata identifying the location and the network property;

encrypt the digital key with a public key corresponding to the management service; and provide an encrypted digital key to the management service to subsequently authenticate the user and the client device, wherein the management service provides conditional access based upon the metadata.

9. The non-transitory computer-readable medium of claim 8, wherein the conditional access provides access to a full set of resources in response to the location comprising an approved location and the network property comprising an approved network property.

10. The non-transitory computer-readable medium of claim 9, wherein the conditional access comprises at least one of reauthenticating the user, obtaining a second authentication factor from the user, or obtaining a biometric authentication of the user.

11. The non-transitory computer-readable medium of claim 8, wherein the instructions authenticate the user and the client device based upon the at least one authentication mechanism with a remotely executed management service by performing a multi-factor authentication process with the management service, wherein the multi-factor authentication process comprises a username, a password, and a secondary authentication factor.

12. The non-transitory computer-readable medium of claim 8, wherein the instructions generate the digital key according to the at least one key parameter by generating a key according to a key generation algorithm specified by the management service.

13. The non-transitory computer-readable medium of claim 8, wherein the instructions further generate a new digital key according to the at least one key parameter in response to detecting a change in the location or the network property.

14. The non-transitory computer-readable medium of claim 13, wherein the network property comprises an indication of whether a network connection of the client device is through a private network connection.

15. A method, comprising:

authenticating a user and the client device based upon at least one authentication mechanism with a remotely executed management service;

obtaining at least one key parameter from the management service, the at least one key parameter specifying how a digital key should be created by the client device;

generating the digital key according to the at least one key parameter, wherein the digital key is generated dependent upon at least one of a location of the client device or a network property to which the client device is connected, the digital key comprising metadata identifying the location and the network property;

encrypting the digital key with a public key corresponding to the management service; and providing an encrypted digital key to the management service to subsequently authenticate the user and the client device, wherein the management service provides conditional access based upon the metadata.

16. The method of claim 15, wherein the conditional access provides access to a full set of resources in response to the location comprising an approved location and the network property comprising an approved network property.

17. The method of claim 16, wherein the conditional access provides access to a subset of a set of resources in response to at least one of the location comprising an unapproved location or the network property comprising an unapproved network property.

18. The method of claim 15, wherein authenticating the user and the client device based upon the at least one authentication mechanism with a remotely executed management service further comprises performing a multi-factor authentication process with the management service, wherein the multi-factor authentication process comprises a username, a password, and a secondary authentication factor.

19. The method of claim 15, wherein generating the digital key according to the at least one key parameter further comprises generating a key according to a key generation algorithm specified by the management service.

20. The method of claim 19, further comprising generating a new digital key according to the at least one key parameter in response to detecting a change in the location or the network property.

\* \* \* \* \*